Figure 1:

Nov. 28, 1967  F. (FREDY) KILCHER  3,354,594
BUILDING STRUCTURE HAVING AN ELASTIC BEARING
MEMBER IN AT LEAST ONE COURSE JOINT, METHOD
FOR MAKING THE STRUCTURE AND INTERMEDIATE
PLY FOR CARRYING OUT THE METHOD
Filed Sept. 1, 1964

INVENTOR.
Fredy Kilcher
BY
*Imrie & Smiley*
Attys.

United States Patent Office 3,354,594
Patented Nov. 28, 1967

3,354,594
BUILDING STRUCTURE HAVING AN ELASTIC BEARING MEMBER IN AT LEAST ONE COURSE JOINT, METHOD FOR MAKING THE STRUCTURE AND INTERMEDIATE PLY FOR CARRYING OUT THE METHOD
Frederick (Fredy) Kilcher, Berthanstrasse 6, Solothurn, Switzerland
Filed Sept. 1, 1964, Ser. No. 393,674
Claims priority, application Switzerland, Dec. 30, 1963, 16,053
8 Claims. (Cl. 52—251)

This invention relates to a building structure having elastic bearing means in at least one course joint between parts of the structure, such elastic bearing means allowing full transmission of forces between adjacent structure parts in a direction perpendicular to the surfaces defining the joint without transmitting substantial shearing or thrust forces when thermal dilatation of the building parts occurs in a direction parallel to the plane of the joint. Consequently such elastic bearing members allow the use of weaker structure parts.

Prior bearing members are made of separate plates of neoprene or the like, such separate plates being spaced from each other along the joint. Therefore, the forces are transmitted locally between the structure parts whereby the elastic bearing members are of little use since the strength of the structure parts has to be adapted to the maximum stresses occurring locally near the bearing plates. In order to obtain bearing surfaces of sufficient size, separate bearing plates of an appreciable width have to be used so that the forces transmitted to the lower structure part are not confined to the center portion of the structure part, and excessive stresses and damaging at the edges of the lower structure part cannot always be avoided. The placing or laying of the bearing plates is difficult and time-consuming, particularly when the upper structure part is to be cast in situ, because in the latter case the free upper surface of the lower structure part at the side of the bearing plates has to be covered by means of a filling material of low strength in order to avoid direct contact between adjacent surfaces of the structure parts at the side of the bearing plates. The loosely applied bearing plates and filling material may subsequently be laterally shifted relatively to each other so that laitance may flow into gaps between the bearing plates and filling material during casting of the concrete forming the upper structure part, whereby undesired rigid bridges may be formed between the structure parts at the side of the elastic bearing plates.

It is the purpose of this invention to avoid the above disadvantages. The structure according to this invention is broadly characterized in that the said bearing means comprise a continuous strip-shaped elastic bearing member for obtaining a continuous distribution of load. Such a bearing member may be made of relatively small width compared to the width of the bearing surface of the lower building structure so that force transmission is substantially confined to the center portion of the bearing surface. Edge pressure and damages resulting therefrom are avoided. The load is continuously transmitted to the carrying structure part whereby local stress maxima are avoided.

It is a further object of this invention to provide a method for making a structure according to the present invention, this method being broadly characterized in that the bearing member and the filling member or members are first assembled and then applied to the upper bearing surface of the lower part of the structure. In this way preparing and application of the bearing member and filling member or members are substantially facilitated and subsequent relative displacement and misalignment of such members after their application are prevented. Preferably the bearing and filling members are applied to a common strip-shaped carrier of sheet material, whereby the so prepared assembly is applied to the bearing surface of the lower structure part with the strip-shaped carrier on top of the bearing and filling members. In this way the carrier of sheet material forms a protecting cover preventing any leakage of laitance into the joints between the bearing member and the filling members or into the filling member when the upper structure part is cast.

It is a further object of this invention to provide a prefabricated intermediated ply for insertion between the structure parts, this ply broadly comprising at least one elastic bearing member and at least one filling member assembled with each other side by side in a substantially common plane. This ply may be prefabricated and may be transported to the building site in rolls where it may be cut to the desired lengths.

The invention will now be further explained with reference to the attached drawing wherein FIG. 1 is a sectional view of the intermediate ply and FIGS. 2 to 6 show each one embodiment of the building structure according to this invention.

The prefabricated intermediate ply shown in FIG. 1 has a strip-shaped, elongated carrier 1 of sheet material, for instance a bituminized, impervious kraft paper, a foil of synthetic resin or the like, carrying in its center a strip 2 of neoprene and at each side of the latter a strip 3 of filling material preferably made of a foam of synthetic resin. Satisfactory results have been obtained with the foam material known under the trade name "Sagex." A suitable water resistant adhesive may be used for assembling parts 1, 2 and 3. All materials used for the prefabricated ply have a relatively high flexibility and may therefore be dispensed from rolls, cut to the desired width, assembled in the manner shown in FIG. 1 and again wound to a roll in the assembled state.

Figure 2:
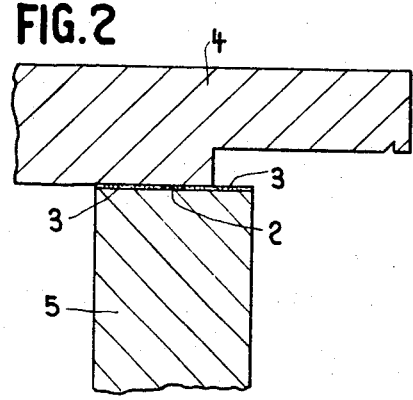

FIG. 2 shows a first embodiment of the structure according to this invention, wherein a concrete roof 4 is supported on the wall 5 of a building, for instance a garage. The above ply is inserted into the joint between the structural parts 4 and 5 with the bearing strip 2 of neoprene in the center of the supporting wall 5. The filling strips 3 are in direct contact with the structure parts 4 and 5, but they practically do not contribute to the transmission of forces between parts 4 and 5, because their pressure and thrust strength is very low compared with the strength of the bearing strip 2 of neoprene. The pressure is transmitted by the strip 1 to the center portion of the supporting wall 5 which is thereby advantageously stressed. It is impossible that substantial stresses are transmitted near the edges of the supporting wall 5 so that damaging of such edges is avoided.

For building the structure shown in FIG. 2 the wall 5 is first completed. The ply 1–3 is then applied to the upper bearing surface of the wall 5 during any suitable stage of construction, preferably after completion of the sheathing for casting the roof but before insertion of the reinforcing irons. The ply thus applied to the wall 5 may be anchored by any suitable means for preventing subsequent displacement thereof. After insertion of the reinforcement of the roof, the roof is cast whereby the upper impervious carrier 1 of the ply prevents leakage of laitance into the joints between members 2 and 3 and into the porous material of members 3. The filling members 3 are made of a material of which the strength is sufficient for withstanding the hydrostatic pressure of the concrete when the roof is cast, whereby a joint is formed between concrete parts 4 and 5 having a thickness substantially equal to the original thickness of ply 1–3. For practical considerations, particularly for allowing easy rolling of the ply, members 2 and 3 have the same thickness. When the concrete of the roof 4 has set the sheathing (not shown in the drawing) is removed, whereafter the full weight of the roof is applied to the strip-shaped bearing member 2 of neoprene. Due to the high pressure acting onto the bearing strip 2 it may easily be deformed by thrust stresses and it will be deformed by dilatation or expansion of the roof 4 without transmitting substantial thrust stresses to the wall 5.

Figure 3:
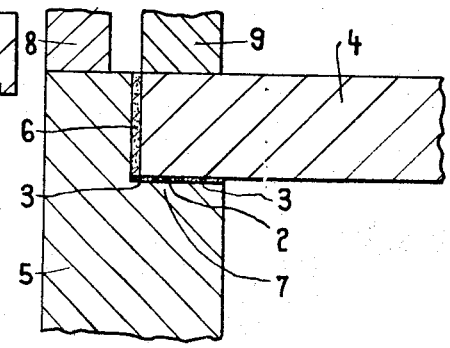

FIG. 3 shows another embodiment of the invention wherein the joint has a horizontal portion and a vertical portion filled with a separate filling member 6 made of a similar or the same material as filling members 3 of the ply. However, the filling member 6 is thicker than filling members 3 in order to take up the horizontal expansion of the ceiling 4. An asymmetrical ply is preferably used wherein the bearing strip 2 of neoprene is mounted between filling members 3 of different width, in order to provide the bearing strip 2 as near as possible to the center of the supporting wall 5.

The outer element 8 of a double-element wall is supported by an upwardly extending rim of wall 5 while the inner element 9 of the double-element wall is supported on the ceiling 4. Wall elements 8 and 9 are arranged for relative horizontal displacement so that the inner element 9 is able to follow the horizontal dilatation of the ceiling rim supporting it.

Figure 4:
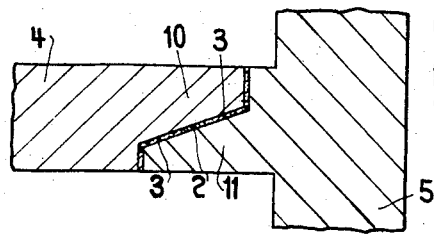

FIG. 4 shows another embodiment of the invention, preferably used where the space available for anchoring the ceiling 4 is limited. In this embodiment the joint has two vertically extending end portions and a slightly inclined mid portion. Bearing members 10 and 11 of bevelled-step cross section are thus obtained on the ceiling 4 and at the wall 5 respectively, the section of such bearing members 10 and 11 increasing in accordance with the increase of bending stresses produced therein by the pressure transmitted through the bearing member 2 of neoprene.

Figure 5:
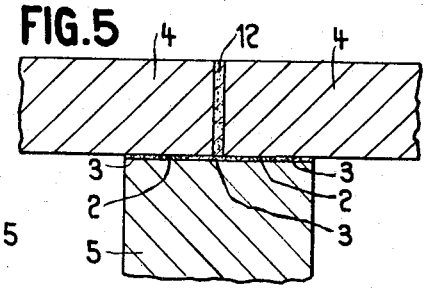

FIG. 5 shows an embodiment wherein two separate ceilings or roofs 4 are supported on a common supporting wall 5. Separate plys 1–3 of the type shown in FIG. 1 may be used for insertion between each of the roofs 4 and the wall 5, or a special ply comprising two bearing strips 2 of neoprene and three filling strips 3 may be used. The joint between the roofs 4 is filled with a particularly thick filling member 12 adapted to take up the sum of expansion of both roofs 4.

Figure 6:
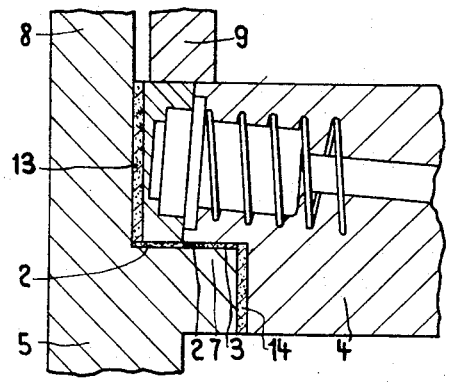

FIG. 6 illustrates the bearing of a prestressed ceiling 4. Two particularly thick filling members 13 and 14 are provided in the vertically extending joint portions. For prestressed ceilings or roofs it is necessary to increase the thickness of the bearing strip 2 of neoprene and of the filling strips 3, since the bearing strip 2 has to take up the contraction of the ceiling 4 during prestressing and subsequent dilatation thereof. The other parts shown in FIG. 6 are designated with the same reference numerals as corresponding parts in FIG. 3.

What I claim is:

1. A building structure having a lower structure portion having an elongated upper bearing surface, a course joint formed between this bearing surface and an upper structure portion made of concrete cast on site, and elastic bearing means in said course joint for transmission of the load of the upper structure portion to the bearing surface of the lower structure portion, said bearing means including a central bearing strip of elastic material and one filling strip at each side of said bearing strip, such filling strips being made of a material having negligible resistance to crushing compared with that of the material of the bearing strip, and said bearing strips and filling strips being cemented to a tape carrier inserted between said upper structure portion and said bearing strip and filling strips, the bearing means formed by said tape carrier, bearing strip and filling strips completely covering the said bearing surface of the lower structure portion.

2. A structure according to claim 1, wherein the joint is defined partially by substantially horizontal bearing surfaces and partially by substantially vertical surfaces of said structure parts, the vertically extending joint portion being filled with a thicker filling member than the substantially horizontally extending joint portion including the bearing member.

3. A structure according to claim 2, comprising a pair of separate base members enclosing between each other a vertically extending joint, and a double-element wall, each element of said double-element wall being supported on one of said separate base members, said wall elements enclosing a hollow vertical joint allowing relative displacement of said wall elements in a direction perpendicular to their plane.

4. A structure according to claim 1, wherein the filling members are thicker than the bearing member.

5. A method for making a building or structure, wherein a lower portion of the structure is completed with an elongated bearing surface at its upper end, providing elastic bearing means and filling members at the side of said bearing means, the resistance to crushing of said filling members being negligible compared with that of the bearing means, said bearing means and filling members being assembled to a continuous elongated strip or tape having a width and length equal to the width and length of said bearing surface, applying the so assembled bearing means and filling members onto the bearing surface thereby completely covering the same, and casting concrete onto the bearing means and filling members for forming an upper portion of the structure.

6. A method for making a building or structure, wherein a lower portion of the structure is completed with an elongated bearing surface at its upper end, providing a strip of elastic bearing material, two strips of filling material and a tape of sheet material having a width equal to the width of said bearing surface, said filling material having a resistance to crushing negligible compared with that of said bearing material, cementing said strips of bearing material and filling material to said tape with the strip of bearing material in the center and said strips of filling material at each side thereof, applying the so prefabricated assembly onto the said bearing surface with the said tape on top of said strips of bearing material and filling material thereby completely covering the bearing surface, and pouring concrete onto said tape for forming an upper portion of said structure.

7. A method according to claim 6, wherein said strips of bearing material and filling material are dispensed from rolls, cut to the desired width and applied onto and cemented to the tape.

8. A method for making a building or structure, wherein a lower portion of the structure is completed with an elongated bearing surface at its upper end, prefabricating an intermediate ply including elastic bearing means and filling means at the side of said bearing means, the resistance to crushing of said filling means being negligible compared with that of the bearing means, said bearing means and filling means being assembled to a continuous elongated strip or tape having a width equal to the width of said bearing surface, applying the intermediate ply onto the bearing surface thereby completely covering the same, and casting concrete onto said intermediate ply for forming an upper portion of the structure.

References Cited

UNITED STATES PATENTS

| | | | |
|---|---|---|---|
| 1,202,457 | 10/1916 | Wales | 52—265 |
| 2,068,098 | 1/1937 | Elmendorf | 52—417 X |
| 2,100,958 | 11/1937 | Honigmann et al. | 52—396 |
| 2,331,389 | 10/1943 | Grund | 52—296 |
| 2,932,964 | 4/1960 | Dobell | 52—396 X |
| 3,107,195 | 10/1963 | Steglar et al. | 156—91 X |
| 3,119,204 | 1/1964 | Williams | 52—396 |
| 3,218,008 | 11/1965 | Harris | 52—396 X |

FOREIGN PATENTS 609,789  11/1960  Canada.

FRANK L. ABBOTT, *Primary Examiner.*

ALFRED C. PERHAM, *Assistant Examiner.*